United States Patent [19]

Nakamura

[11] Patent Number: 4,520,775
[45] Date of Patent: Jun. 4, 1985

[54] INTAKE SYSTEM FOR MULTIPLE VALVE TYPE ENGINE

[75] Inventor: Haruo Nakamura, Shizuoka, Japan

[73] Assignee: Yamaha Hatsudoki Kabushiki Kaisha, Japan

[21] Appl. No.: 322,768

[22] Filed: Nov. 19, 1981

[30] Foreign Application Priority Data

Nov. 20, 1980 [JP] Japan .................. 55-163988

[51] Int. Cl.³ ............................................ F02M 35/10
[52] U.S. Cl. .................... 123/308; 123/315; 123/52 M
[58] Field of Search ............... 123/308, 310, 315, 432, 123/433, 52 M, 445; 261/23 A

[56] References Cited

U.S. PATENT DOCUMENTS

| | | | |
|---|---|---|---|
| 2,481,890 | 9/1949 | Toews | 123/310 |
| 3,698,371 | 10/1972 | Mitsuyama et al. | 123/52 M |
| 4,256,068 | 3/1981 | Irimajiri et al. | 123/310 |
| 4,264,535 | 4/1981 | Kikura | 123/52 M |
| 4,270,500 | 6/1981 | Nakagawa et al. | 123/308 |
| 4,271,801 | 6/1981 | Yamakawa et al. | 123/308 |
| 4,300,504 | 11/1981 | Tezuka | 123/432 |
| 4,317,438 | 3/1982 | Yagi et al. | 123/308 |

FOREIGN PATENT DOCUMENTS 31724 8/1972 Japan .
132356 9/1980 Japan .

*Primary Examiner*—Parshotam S. Lall
*Assistant Examiner*—W. R. Wolfe
*Attorney, Agent, or Firm*—Ernest A. Beutler

[57] ABSTRACT

An improved performance internal combustion engine having a pair of intake passages that supply the charge to a single chamber of the engine. A valving arrangement is provided so that the idle charge is supplied primarily through one of the intake passages and the full load charge is supplied through both passages. An interconnecting passage interconnects the passages with each other downstream of the throttle valves so that at least a portion of even the idle charge will be supplied through both passages to cool the intake valves associated with the passages and to ensure against the collection of deposits. In accordance with a feature of the invention, a pair of spark plugs are positioned in the chamber at its outer periphery on diametrically opposite sides of the cylinder.

11 Claims, 4 Drawing Figures

INTAKE SYSTEM FOR MULTIPLE VALVE TYPE ENGINE

BACKGROUND OF THE INVENTION

This invention relates to an improved intake system for a multiple valve type engine and more particularly to an improved induction arrangement that provides good running throughout the engine speed and load ranges and which ensures against the accumulation of unnecessary combustion deposits in the induction passages. In addition, the invention relates to an improved spark plug arrangement for such an engine.

It has been proposed to improve the output of an internal combustion engine by providing at least a pair of separate intake passages that deliver the intake charge to the combustion chambers of the engine. In order to ensure good running at low speeds, it has been proposed to employ a throttle valve arrangement in one of the induction passages that is operated in sequence with the main throttle valve so that the idle and low load charge requirements are supplied through only one of the intake passages. In this way higher velocities of induction are possible so as to improve the running under these conditions. However, the remaining induction passage is generally stagnant during such running even though the associated intake valve with it opens and closes. As a result, it is possible that combustion deposits such as carbon may accumulate in the non-utilized intake passage. In addition, since there is no flow of intake air across this intake valve, it may not be cooled sufficiently and cause overheating and/or early wear.

It is, therefore, a principal object of this invention so as to provide an improved induction system for an internal combustion engine.

It is another object of the invention to provide an induction system for an internal combustion engine embodying plural intake passages wherein good running is achieved throughout the engine speed and load ranges without detrimental effects in the induction system.

Engines embodying multiple intake passages and throttle valves for controlling the flow so that only one of the intake passages serves the major portion of the charge requirements at low loads may have different flow conditions existing within the combustion chamber when different numbers of the intake passages are serving the chambers. That is, when only one of the intake passages is serving the chamber, a swirling pattern may be established in the combustion chamber. When both passages, however, are supplying the charge, either a non-swirling pattern may be established or a flow path in a completely different direction may exist. Thus, if only a single spark plug is employed in the combustion chamber, this plug may not be positioned at the optimum location to fire the charge under all running conditions.

It is, therefore, a further object of this invention to provide an improved combustion chamber and spark plug location for a multiple intake passage internal combustion engine.

SUMMARY OF THE INVENTION

A first feature of this invention is adapted to be embodied in an induction system for an internal combustion engine of the type having a pair of intake ports serving the same chamber of the engine with separate intake passages each independently serving a respective one of the intake ports. Throttle valve means are provided in the intake passages for controlling the flow therethrough and means actuate the throttle valve means so that the low load condition will be served primarily through the first induction passage and the high load condition will be served through both of the induction passages. In accordance with this feature of the invention, an interconnecting passage extends between the first and second intake passages downstream of the throttle valve means so that a portion of the idle charge requirements will be supplied through the second intake passage.

Another feature of the invention is adapted to be embodied in an induction system for an internal combustion engine having a combustion chamber that is defined at least in part by a cylinder head, a cylinder bore and a piston. A pair of intake ports communicate with the combustion chamber and a pair of intake valves control the flow through the respective intake ports. In accordance with this feature of the invention, a pair of spark plugs are provided in the combustion chamber having their terminals disposed on diametrically opposite sides of the chamber.

DETAILED DESCRIPTION OF THE PREFERRED EMBODIMENTS

Figure 1:
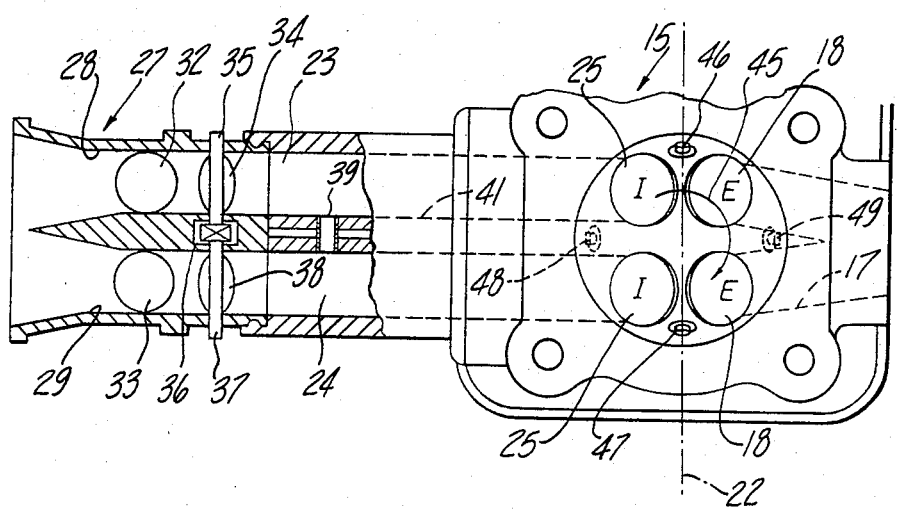
FIG. 1 is a bottom plan view, with portions broken away, of the cylinder head and induction system of an engine constructed in accordance with this invention and is taken generally in the direction of the line 1—1 of FIG. 2.
Figure 2:
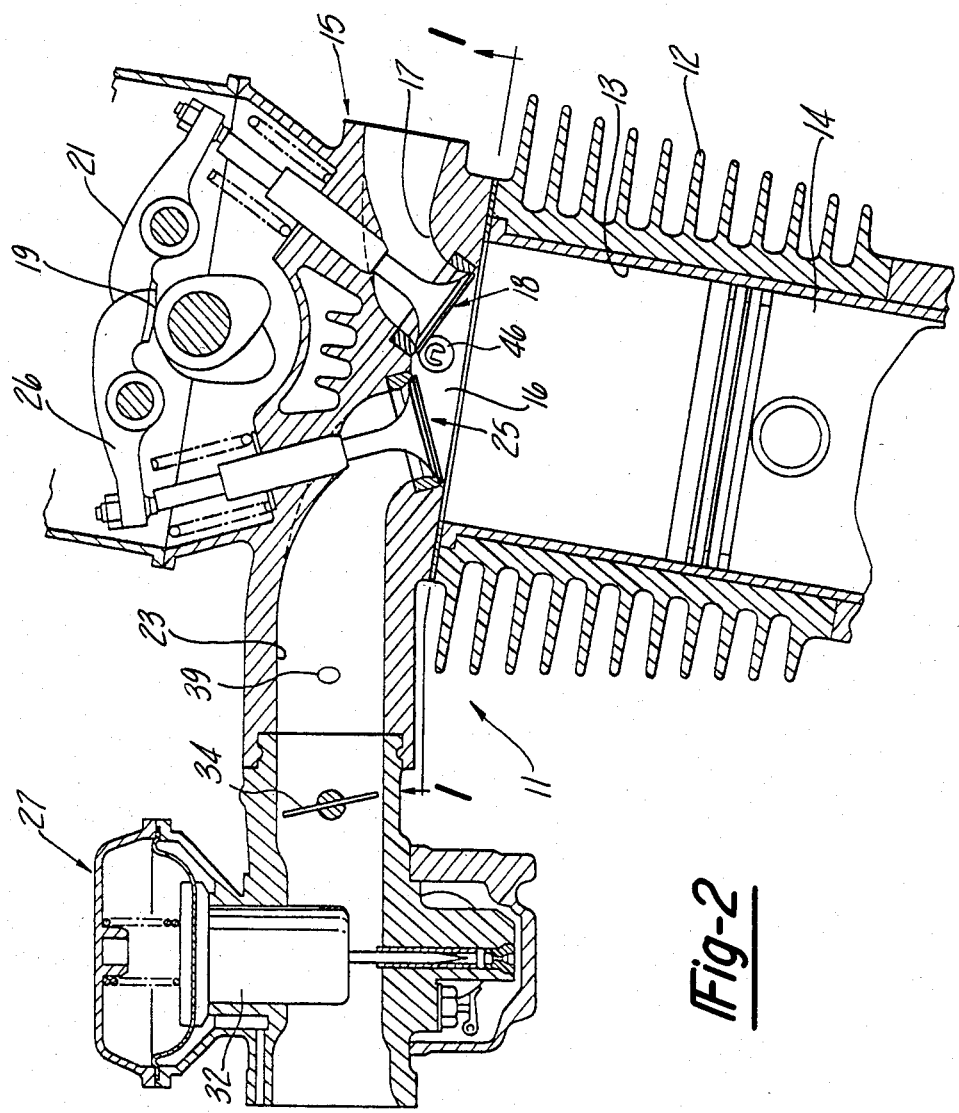
FIG. 2 is an enlarged cross-sectional view taken through a single cylinder of the engine.

In the drawings the reference numeral 11 indicates generally an internal combustion engine embodying this invention. The engine 11 in the illustrated embodiment is of the single cylinder type; however, it should be readily apparent to those skilled in the art that the invention may be used in conjunction with engines having a greater number of cylinders and engines of other types.

The engine 11 includes a cylinder block 12 having a cylinder bore 13 in which a piston 14 is supported for reciprocation in a known manner. A cylinder head, indicated generally by the reference numeral 15, is affixed to the cylinder block 12 in a known manner. The cylinder head 15 has a recess 16 which with the piston 14 and cylinder bore 13 forms a chamber of volume which varies as the piston 14 reciprocates. The cavity 16 will, at times, hereinafter be referred to as the combustion chamber.

A pair of exhaust ports 17 are formed in one side of the cylinder head 15 and communicate with the combustion chamber 16 via exhaust valves 18 that are operated in any suitable manner, for example by means of an overhead mounted camshaft 19 and rocker arms 21. The exhaust valves 18 are positioned on one side of a vertically extending plane 22 (FIG. 1) that includes the axis of the cylinder bore 13.

On the other side of the plane 22, the cylinder head 15 is formed with a primary intake passage 23 and a secondary intake passage 24. The primary and secondary intake passages 23, 24, communicate with the combustion chamber 16 through respective intake valves 25. The intake valves 25 are operated in unison by means of the overhead camshaft 19 via individual rocker arms 26. The intake valves 25 are positioned on the diametrically opposite side of the plane 22 from the exhaust valves 18.

A staged, two barrel carburetor, indicated generally by the reference numeral 27 is provided for delivering a fuel/air charge to the intake passages 23 and 24. The carburetor 27 has a primary barrel 28 that is aligned with the primary intake passage 23 and a secondary barrel 29 that is aligned with the cylinder head secondary intake passage 24. Sliding pistons 32 and 33 are provided in the barrels 28 and 29, respectively, for controlling the size of the venturi therein and for controlling the amount of fuel discharge as is well known with this type of carburetor. The barrels 28 and 29 receive an intake charge of air from an air cleaner (not shown).

A throttle valve 34 is positioned in the primary carburetor barrel 28 downstream of its sliding piston 32. The primary throttle valve 34 is adapted to be coupled to any suitable form of mechanical actuator that is operated by the operator. The primary throttle valve 34 is supported upon a primary throttle valve shaft 35 which is connected, by means of a coupling mechanism 36 to a secondary throttle valve shaft 37. A secondary throttle valve 38 is affixed to the secondary throttle valve shaft 37 in the carburetor barrel 29 downstream of the piston 33. The coupling mechanism 36 is designed so that the secondary throttle valve 38 and its shaft 37 are opened after a predetermined opening of the primary throttle valve 34. Once this predetermined opening is reached, the secondary throttle valve 38 will be progressively opened so that both throttle valves 34 and 38 either reach their fully opened position at the same time, or so that the secondary throttle valve 38 may continue to move to its opened position once the primary throttle valve 34 is fully opened. Any of the well known linkage arrangements may be employed for this purpose.

The construction of the engine 11 as thus far described may be considered to be conventional. With such an arrangement, the idle and low speed charge requirements for the engine will be supplied primarily through the primary intake passage 23. With previously constructed arrangements of this type, however, the lack of flow through the secondary intake passage 24 has been found to provide inadequate cooling for its associated intake valve and, furthermore, exhaust gases and solid carbon particles may be blown back into the passage 24 so as to obstruct the operation of the secondary throttle valve 38. To avoid these difficulties, a connecting passage 39 is formed in a wall 41 that divides the primary intake passage 23 from the secondary intake passage 24. The connecting passage 39 permits a portion of the intake charge from the primary intake passage 23 to flow into the secondary intake passage 24 at such times as the secondary throttle valve 38 is closed. This cross flow will provide sufficient flow through the secondary intake passage 24 so as to cool the intake valve associated with it as well as to eliminate the accumulation of deposits in the secondary intake passage 24 and on the secondary throttle valve 38. The size and orientation of the connecting passage 39 may be chosen to achieve the desired cross flow between the primary intake passage 23 and the secondary intake passage 41.

Figure 3:
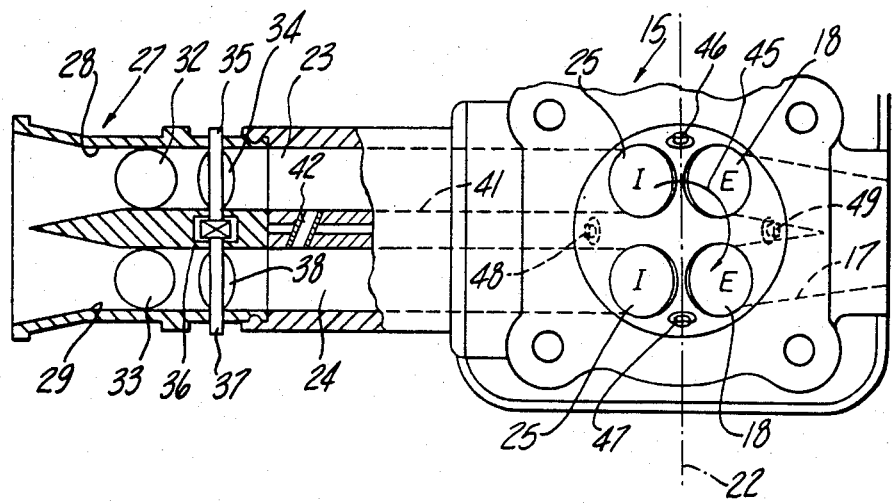
FIG. 3 is a bottom plan view, with portions broken away, similar to FIG. 1 and shows another embodiment of the invention.
Figure 4:
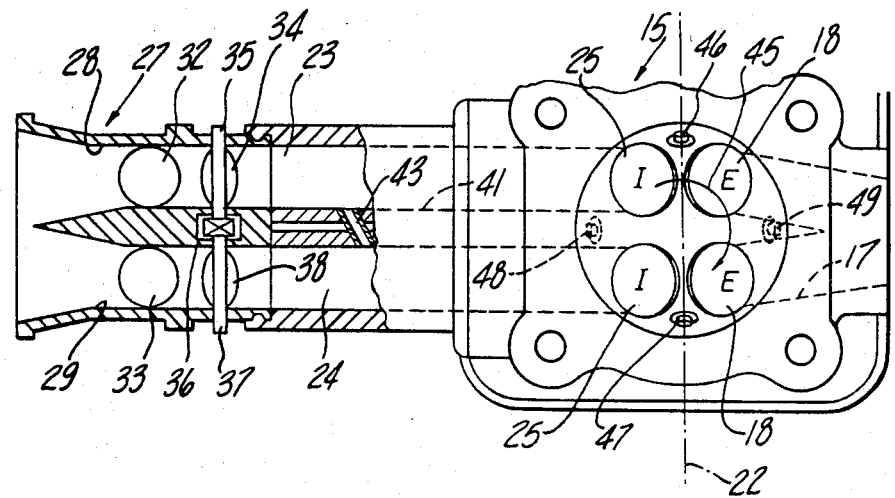
FIG. 4 is a bottom plan view, with portions broken away, similar to FIGS. 1 and 3 showing a still further embodiment of the invention.

If desired, the connecting passage may be formed at an angle between the two intake passages 23 and 24 as shown by either FIG. 3 wherein the passage is inclined as shown by the reference numeral 42 or FIG. 4 wherein the opposite inclination is shown by the reference numeral 43. The connecting passage may be formed either by drilling or by casting an insert in place or in any other suitable manner.

In operation, when the engine 11 is running at low speeds and only the primary throttle valve 34 is partially opened, the intake charge will be delivered to the chamber 16 primarily through the intake valve 25 associated with the primary intake passage 23. Of course, as has been noted, a small amount of charge will also be delivered to the chamber through the connecting passageway 39 and secondary intake passage 24. Because the primary portion of the charge is delivered through the primary intake passage 23, a swirl will be generated in the intake charge as indicated by the arrow 45 in FIG. 1. This swirling motion will tend to cause the heavier fuel particles to be driven outwardly in the chamber so that there will be a richer fuel/air mixture at the periphery of the chamber 16 than in the center. For this reason, a spark plug 46 is located on the plane 22 at the outer peripheral edge of the chamber 16. Thus, it will be ensured that the fuel/air mixture of combustible proportions will be present at the gap of the spark plug 46 at the time it is fired.

When the engine 11 is operating at higher speeds and both throttle valves 34 and 38 are opened, this swirl will no longer be present. In order to ensure complete combustion at higher speeds, a second spark plug 47 is positioned on the plane 22 diametrically opposite the plug 46. Thus, under these running conditions there will be good ignition and complete combustion within the chamber.

Rather than placing the spark plugs 46 and 47 on the plane 22, they may be placed on a plane that is perpendicular to this plane as indicated by the phantom lines 48 and 49 in FIG. 1. The same good ignition will occur with this location and again it should be noted that the spark plugs 48 and 49 are positioned with their gaps at the periphery of the chamber 16.

It should be readily apparent that embodiments of the invention have been disclosed that provide good running characteristics throughout the complete engine speed and load ranges. In addition, an arrangement is provided wherein the secondary induction passage does deliver a small portion of the charge to the engine even at low speed running so as to cool the intake valve associated with this passage and to eliminate the likelihood of deposits forming on the throttle valve associated with it. In addition, this flow ensures that a balanced pressure will be exerted on opposite sides of the secondary throttle valve 38 so as to not interfere with its opening. Although some embodiments are disclosed, it should be obvious to those skilled in the art that various changes and modifications may be made without departing from the spirit and scope of the invention, as defined by the appended claims.

I claim:

1. In an induction system for an internal combustion engine of the type having a pair of intake ports for providing a charge to a common chamber of the engine, separate intake passages each independently serving a respective one of said intake ports, throttle valve means in said intake passages for controlling the flow therethrough so that an idle charge is delivered to the chamber primarily through a first of said intake passages and wide open load charge requirements are supplied through both of said induction passages, the improvement comprising an interconnecting passage extending between said first intake passage and the second intake passage downstream of said throttle valve means for providing communication between said passages regardless of the position of said throttle valve means.

2. In an induction system as set forth in claim 1 wherein the connecting passage extends perpendicularly through a wall separating the first and second intake passages.

3. In an induction system as set forth in claim 1 wherein the interconnecting passage extends at an acute angle through a common wall separating the first and second intake passages.

4. In an induction system as set forth in claim 1 wherein the interconnecting passage extends at an obtuse angle through a wall separating the first and second intake passages.

5. In an induction system as set forth in claim 1 further including a spark plug in the chamber at a peripheral portion thereof.

6. In an induction system as set forth in claim 5 further including a second spark plug positioned in opposition to the first spark plug.

7. In an induction system as set forth in claim 6 wherein the chamber is formed by a cylinder bore and the spark plugs are located on a diameter of the cylinder bore.

8. In an induction system as set forth in claim 7 wherein the intake ports are disposed on one side of a plane extending through the axis of the cylinder bore.

9. In an induction system as set forth in claim 8 wherein the spark plugs lie in the plane.

10. In an induction system as set forth in claim 8 wherein the spark plugs lie on a diameter that is perpendicular to the plane.

11. In an induction system as set forth in any of claims 1 through 10 wherein the throttle valve means comprises a first throttle valve in the first intake passage and a second throttle valve in the second intake passage and the means for operating the throttle valves including means for effecting opening of the first throttle valve prior to opening of the second throttle valve.

* * * * *